(12) United States Patent
Zimmermann et al.

(10) Patent No.: US 9,016,394 B2
(45) Date of Patent: Apr. 28, 2015

(54) POWER TOOL

(75) Inventors: Thilo Zimmermann, Stuttgart (DE); Heiko Roehm, Stuttgart (DE); Joerg Welke, Ettlingen-Schoellbronn (DE); Dietmar Saur, Gomaringen (DE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 12/688,942

(22) Filed: Jan. 18, 2010

(65) Prior Publication Data

US 2010/0212923 A1 Aug. 26, 2010

(30) Foreign Application Priority Data

Feb. 25, 2009 (DE) .................. 10 2009 001 132

(51) Int. Cl.
- B25B 21/00 (2006.01)
- B23B 45/00 (2006.01)
- B25D 16/00 (2006.01)
- B25F 5/00 (2006.01)

(52) U.S. Cl.
CPC ............ B25B 21/008 (2013.01); B23B 45/008 (2013.01); B25D 16/006 (2013.01); B25D 2250/205 (2013.01); B25D 2250/221 (2013.01); B25F 5/001 (2013.01)

(58) Field of Classification Search
CPC ....... B25F 5/001; B25B 21/00; B25B 21/008; B25D 16/006
USPC ............ 173/47, 216, 217; 475/104, 218, 298, 475/299
See application file for complete search history.

(56) References Cited

U.S. PATENT DOCUMENTS

| | | | | |
|---|---|---|---|---|
| 3,960,035 | A | * | 6/1976 | Workman et al. .............. 475/125 |
| 4,215,594 | A | * | 8/1980 | Workman et al. .............. 475/266 |
| 4,597,453 | A | * | 7/1986 | Kilmer et al. ................. 173/171 |
| 4,791,833 | A | * | 12/1988 | Sakai et al. .................... 475/299 |
| 5,339,908 | A | * | 8/1994 | Yokota et al. ................. 173/216 |
| 5,607,266 | A | | 3/1997 | Anderson |
| 5,754,019 | A | | 5/1998 | Walz |
| 5,897,454 | A | * | 4/1999 | Cannaliato .................... 475/265 |
| 5,967,934 | A | | 10/1999 | Ishida et al. |
| 6,244,358 | B1 | | 6/2001 | Beer et al. |
| 6,398,678 | B1 | | 6/2002 | Chin-Feng |
| 6,655,470 | B1 | * | 12/2003 | Chen ............................... 173/47 |
| 6,696,814 | B2 | | 2/2004 | Henderson et al. |
| 6,796,921 | B1 | * | 9/2004 | Buck et al. .................... 475/299 |
| 6,800,045 | B1 | | 10/2004 | Staver |
| 6,914,420 | B2 | | 7/2005 | Crocker |
| 6,939,262 | B1 | * | 9/2005 | Yu ................................. 475/218 |
| 6,978,846 | B2 | | 12/2005 | Kawai et al. |

(Continued)

FOREIGN PATENT DOCUMENTS

| | | |
|---|---|---|
| CN | 1526192 | 9/2004 |
| CN | 1526195 | 9/2004 |

(Continued)

*Primary Examiner* — Andrew M Tecco
*Assistant Examiner* — Nathaniel Chukwurah
(74) *Attorney, Agent, or Firm* — Michael J. Striker

(57) ABSTRACT

A power tool includes a drive motor and at least one auxiliary device, which is coupled to the drive motor, for activating at least two different operating states. The drive motor and the at least one auxiliary device are controllable using at least one operating device. The output of the drive motor is changed when the at least one auxiliary device is activated. As a result, the operating forces are reduced when switching between operating states, and the load on components is reduced.

5 Claims, 2 Drawing Sheets

(56) References Cited

U.S. PATENT DOCUMENTS

| | | | |
|---|---|---|---|
| 6,984,188 B2 * | 1/2006 | Potter et al. | 475/298 |
| 7,882,900 B2 | 2/2011 | Borinato et al. | |
| 8,261,642 B2 | 9/2012 | Braedstroem et al. | |
| 8,469,115 B2 | 6/2013 | Kondo et al. | |
| 2001/0024601 A1 | 9/2001 | Miescher et al. | |
| 2004/0192489 A1 * | 9/2004 | Chen | 475/257 |
| 2006/0118314 A1 | 6/2006 | Aeberhard et al. | |
| 2008/0032848 A1 * | 2/2008 | Ho | 475/299 |
| 2008/0110653 A1 * | 5/2008 | Zhang et al. | 173/1 |
| 2009/0071671 A1 | 3/2009 | Zhong et al. | |
| 2011/0162861 A1 | 7/2011 | Borinato et al. | |

FOREIGN PATENT DOCUMENTS

| | | |
|---|---|---|
| CN | 2756405 | 2/2006 |
| CN | 2936607 | 8/2007 |
| CN | 101166598 | 4/2008 |
| EP | 2 030 710 | 3/2009 |
| GB | 2 304 067 | 3/1997 |
| GB | 2 421 463 | 6/2006 |
| JP | 07308813 | 11/1995 |
| WO | 2009/051543 | 4/2009 |
| WO | 2009/095095 | 8/2009 |
| WO | 2010/041600 | 4/2010 |

* cited by examiner

POWER TOOL

CROSS-REFERENCE TO A RELATED APPLICATION

The invention described and claimed hereinbelow is also described in German Patent Application DE 10 2009 001 132.3 filed on Feb. 25, 2009. This German Patent Application, whose subject matter is incorporated here by reference, provides the basis for a claim of priority of invention under 35 U.S.C. 119(a)-(d).

BACKGROUND OF THE INVENTION

The present invention relates to power tools.

Publication U.S. Pat. No. 6,800,045 B1 makes known a power tool, in the form of a drill, the gearbox of which is coupled to the drive motor and is connected to an auxiliary gear device. The auxiliary gear device automatically lowers the gear ratio during operation in accordance with the resistance to rotation presented. This means, for instance, that the rotational speed of the gearbox is reduced during drilling operation if the hardness of the material to be drilled increases. This is made possible via the known auxiliary gear device without the need to stop the drive.

Furthermore, it is made known in JP 7308813A to provide a shifting device on a column drill, the shifting device making it possible to change gears rapidly during operation. Further details, in particular those regarding the control of rotational speed during gear shifting, are not provided in the document.

From U.S. Pat. No. 6,978,846 it is known, with regard for a torque-controlled impact driver, to adapt the rotational speed of the drive to the torque required to drive a screw, and to the screw-driving status. In the case of the known impact driver, it is not possible to shift gears while driving a screw.

From U.S. Pat. No. 5,754,019 it is known to control the electric motor of a power tool such that it is automatically switched to another operating state once a limiting torque is reached. In this other operating state, the tool switches to indexed operation, e.g., when a screw is being driven, and the screw is driven completely into place. The motor speeds and/or time intervals of motor operation that occur during the other operating state may be adapted as needed.

From U.S. Pat. No. 6,398,678 B1 it is known to change the rotational speed of the drive motor of a power tool without having to stop the drive motor. This is realized via manual input to a wheel that changes the position of a transmission belt located between bevel gears.

SUMMARY OF THE INVENTION

The present invention is based on the object of developing a power tool in a manner such that the switch from a first operating state to a second operating state, e.g., by switching gears or changing the operating mode, is carried out on an as-needed basis and in a manner that is gentle on the components of the power tool.

This is attained in the present invention by changing the output of the drive motor during activation of the at least one auxiliary device. As a result, it is possible to reduce, in particular, the output of the drive motor in order to go easy on, e.g., the gears of a gear box while switching between two gears. In this manner it is also possible to ensure that, when an operator changes an operating state, this does not result in damage occurring to components, even in a parameter range that has not been adapted, and that the operating forces required to switch to the new operating state are reduced. In all, a power tool according to the present invention therefore has a robust design, non-critical handling, and a long component service life.

All combinations of at least two features disclosed in the description, the claims, and/or the figures are included in the scope of the present invention.

Particularly advantageously, the present invention may be used in a power tool that is designed as an electrical screwdriver, an electrical drill/driver, an electrical impact driver, a drill, an impact drill, or a rotary hammer, and that includes a multistage gearbox and/or a plurality of operating modes (e.g., drilling/impact drilling) since this results in a reduction of operating forces and minimal damage to the gearbox components. Preferably, the power tool may also include an axial drive device, in particular an impact drilling device.

It is also possible to provide a common operating element for the drive motor and the auxiliary device in order to simplify operation and enable automatic switching between operating modes.

By reducing the output of the drive motor, it is possible to reduce the load on the components during operation of the power tool, and to reduce the operating forces that occur when switching between the operating states.

However, it is also possible to reduce the load on the components and to switch easily between operating states when the output of the drive motor is temporarily increased. This is the case, e.g., when the aim is to switch between two gears of a gearbox while the operator does not foresee operating the power tool otherwise. Blockage and/or increased wear on gearbox components is prevented as a result.

The power tool according to the present invention may be designed, particularly advantageously, as an electrical screwdriver, and electrical drill/driver, an electrical impact driver, a drill, an impact drill, or a rotary hammer.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
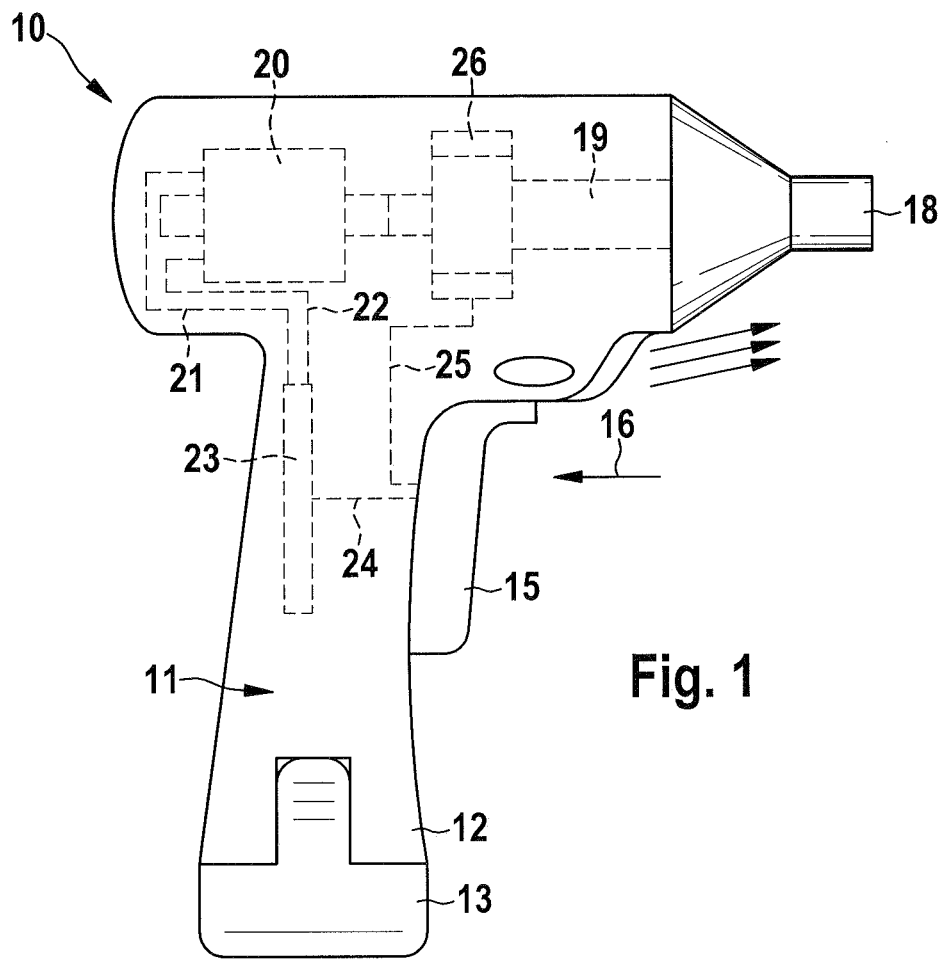
FIG. 1 shows a cordless drill, in a simplified depiction in accordance with the present invention.

FIG. 1 shows a cordless drill 10 which includes a housing 11. A rechargeable battery pack 13, which is used as the energy source for the drive (motor) and electronics of cordless drill 10, is also shown on the lower end of handle 12. Furthermore, a switch lever 15, which may be moved by an operator in the direction of arrow 16, is supported on handle 12. A movement of switch lever 15 in the direction of arrow 16 will also be referred to below as displacement path S of switch lever 15.

Cordless drill 10 includes, in its interior, a drive motor 20 which is coupled to a drill chuck 18 or a spindle via a gearbox 19. Drive motor 20 is connected via lines 21, 22 to an output control switch 23 which is connected via a line 24 to switch lever 15, and is controlled by the same.

Switch lever 15 is also connected via a connection 25 to an automatic shifting device 26 designed as an auxiliary device. Shifting device 26 may switch, e.g., the gear reduction of gearbox 19 coupled to drive motor 20 between two stages, namely a first stage having a high reduction (=low rotational speed of drill chuck 18), and a second gear having a low reduction (=high rotational speed of drill chuck 18). Shifting device 26 is notified via connection 25 to switch gears when displacement path S has reached a certain value.

Figure 2:
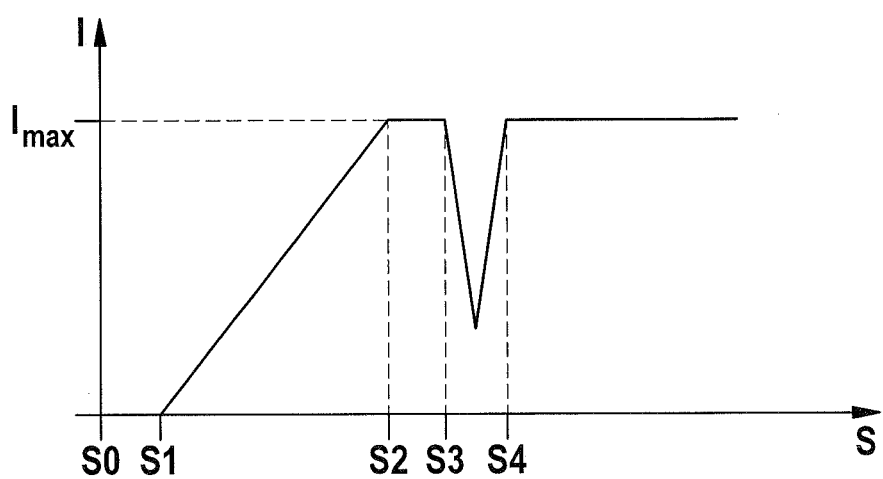
FIG. 2 shows the graph of current I of the drive motor of the cordless drill according to FIG. 1, plotted against actuation path S of a switch lever in accordance with the present invention.

The operation of cordless drill 10 according to the present invention is explained in greater detail below with reference to FIG. 2. It is shown that, between actuation path S0 and S1, current I does not yet flow through drive motor 20. The path between S0 and S1 corresponds to the position of switch lever 15 in which the operator has placed his finger on switch lever 15 but does not yet want to drill. As a result, drive motor 20 is prevented from being accidentally started up via a slight movement of the operator's finger.

If switch lever 15 is pressed further, a current I, which increases along displacement path S, flows through drive motor 20, between positions S1 and S2. This is equivalent to an increasing speed of drive motor 20 or drill chuck 18, while gearbox 19 remains in its second gear (=low reduction). Current $I_{max}$ associated with position S2 corresponds to the limit value of current I through drive motor 20, which is limited in terms of the (long-term) loadability of drive motor 20 in particular.

If switch lever 15 is moved further, past S2, in the direction toward S3, shifting device 26 should shift to first gear, with increased reduction, in order to increase the torque. Therefore, as soon as position S3 on switch lever 15 has been reached, shifting device 26 is actuated via connection 25. At the same time, according to the present invention, current I through drive motor 20 is reduced between positions S3 and S4 while the gear is shifted. As a result, the torque present at the drive train of drive motor 20, i.e., the torque present in shifting device 26, in particular, is also reduced. As a result, the shifting procedure itself may be implemented by shifting device 26 using less torque. These reduced torques also make it possible to switchover or to shift gears when drive motor 20 should be blocked.

In addition, when actuation path S is traversed in the opposite direction, between S4 and S3, it is assumed that less torque is required, and so shifting takes place in drive motor 20 using less current I. Shifting device 26 shifts from the gear having a high reduction to the gear having low reduction.

Figure 3:
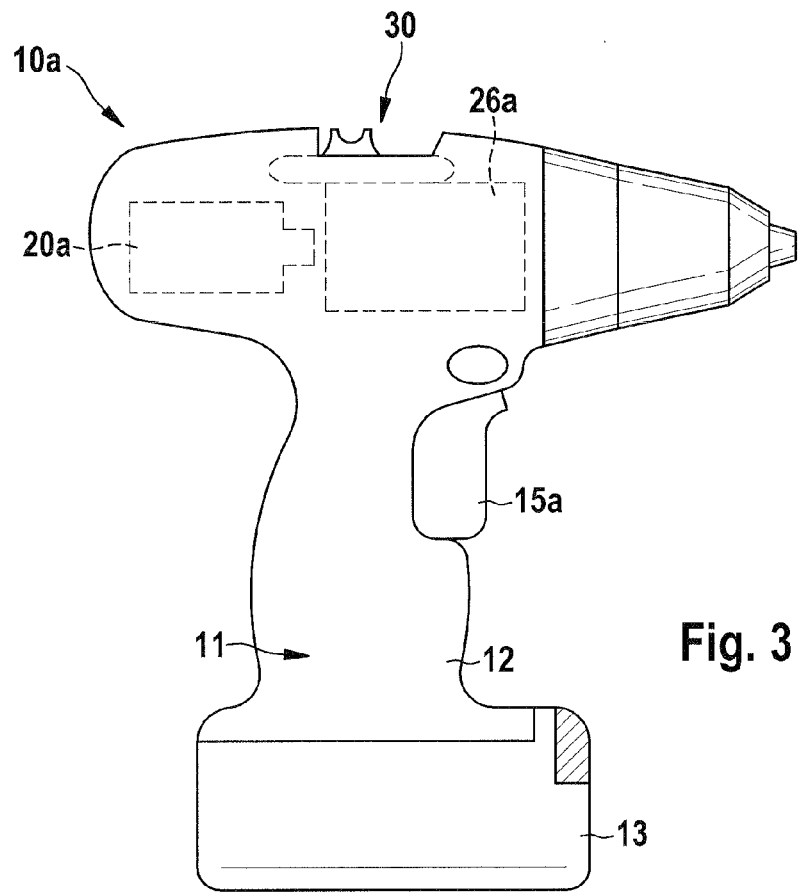
FIG. 3 shows a modified cordless drill, in a simplified depiction in accordance with the present invention.

Modified cordless drill 10a shown in FIG. 3 includes a manually actuatable gear-change switch 30 which is coupled to shifting device 26a. In cordless drill 10a, in contrast to cordless drill 10, switch lever 15a is therefore coupled only to drive motor 20a.

Figure 4:
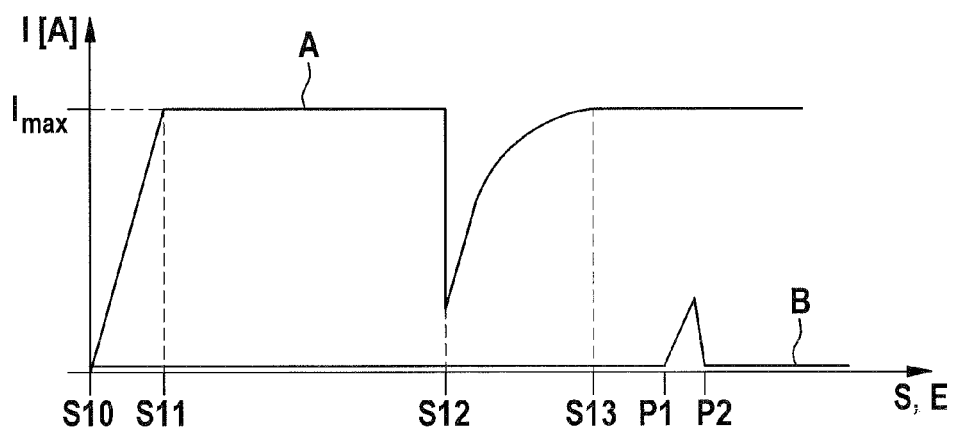
FIG. 4 shows the graph of current I of the drive motor of the cordless drill according to FIG. 3, in various operating modes in accordance with the present invention.

Two different operating modes of cordless drill 10a are described in greater detail below with reference to FIG. 4. Curve A represents the case in which the operator initially increases the rotational speed continually (with the second gear engaged, with low reduction) between positions S10 and S11, thereby resulting in a correspondingly continually increasing current I through drive motor 20a. Maximum current $I_{max}$ flows through drive motor 20a between positions S11 and S12. To increase the torque present at the gearbox of cordless drill 10a, it is necessary to switch to the first gear which has a higher reduction than the second gear. This is carried out manually by the operator via actuation of gear-change switch 30. This should take place in position S12, although it is pointed out that this could also take place in another position of switch lever 15a. As a result of the actuation of gear-change switch 30 in position S12, current I through drive motor 20a is temporarily reduced, and so shifting device 26a shifts gears in a manner analogous to cordless drill 10, with less torque present in the drive train. Shifting has been complete in position S13.

The second operating mode, represented by curve B, depicts the case in which the operator wants to shift gears, e.g., from second gear to first gear, without cordless drill 10a being operational and/or without drilling. Drive motor 20a is therefore (initially) at a standstill. FIG. 4 therefore shows the graph of current I through drive motor 20a during gear-shifting event E. It should be mentioned that, if the gear is shifted while drive motor 20a is at a standstill, the driving toothing may come to rest on its end face between a shifting internal gear and its counterpart. This results in blockage occurring in shifting device 26a. This is prevented, according to the present invention, in that, when the operator wants to shift gears by actuating gear-change switch 30 without also actuating switch lever 15a, drive motor 20a is operated during the gear change at a low rotational speed, e.g., 10 revolutions per minute, as indicated in FIG. 4 by the portion of the graph between points P1 and P2, and so a small amount of current I temporarily flows through drive motor 20a. This prevents gears or gearbox components in the gearbox of cordless drill 10a from becoming jammed.

It is also mentioned that the present invention may also be used, of course, in power tools other than cordless drills 10, 10a described herein. Furthermore, the application is not limited to gear shifting as described herein. The current and/or output through a drive motor may also be reduced in an analogous manner, e.g., when changing an operating mode (e.g., from drilling to impact drilling). In addition, a plurality of functions (gear shifting, operating modes) may be realized on the same power tool, in which case every one of the functions may influence the current flow or power consumption of the drive motor of the power tool.

It is furthermore mentioned that the output may be changed not only by changing the current profile, but also, e.g., by modifying a pulse width modulation or the like.

It will be understood that each of the elements described above, or two or more together, may also find a useful application in other types of constructions differing from the types described above.

While the invention has been illustrated and described as embodied in a power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A power tool, comprising:
an electric drive motor;
a gear;
a gear shifting device for shifting the gear reduction of the gear between a first gear and a second gear; and
a switch for controlling a power output of said electric drive motor;
wherein said switch is connected to said gear shifting device such that the gear is shifted when a predetermined position along the displacement path of said switch is reached;
wherein the power output of said electric drive motor is temporarily reduced while gear shifting of the gear shifting device takes place, through a speed reduction of a pinion of said electric drive motor; and
wherein upon completion of said gear shifting, the power output is returned to the power output at a time just prior to the temporary power reduction.

2. A power tool, comprising:
an electric drive motor;
a gear;
at least one auxiliary device coupled to said electric drive motor for switching between at least two different operating states, said auxiliary device embodied as a gear shifting device for shifting the gear reduction of the gear between a first gear and a second gear; and
at least one operating device, said at least one operating device being a common operating device for controlling said gear shifting device which is used by said at least one auxiliary device and for controlling said electric drive motor;
wherein said operating device is a switch that is connected to said electric drive motor for controlling a power output of said electric drive motor and which is connected to the gear shifting device for controlling the gear shifting device;
wherein said gear shifting device is actuated to shift the gear between a first gear and a second gear and at the same time, the power output of said electric drive motor is temporarily reduced through a speed reduction of a pinion of said electric drive motor while gear shifting takes place when a predetermined position along the displacement path of the switch is reached; and
wherein upon completion of the shift between the first and the second gear, the power output of said electric motor returns to the power output at a time just prior to the temporary power reduction.

3. The power tool as defined in claim 2, wherein said electric drive motor has an output which is changed by reducing a current through said electric drive motor.

4. The power tool as defined in claim 2, wherein said electric drive motor has an output which is changed by modifying a pulse width modulation.

5. The power tool as defined in claim 2, wherein said power tool is a tool selected from the group consisting of an electrical screwdriver, an electrical drill, an electrical driver, an electrical impact driver, a drill, an electric impact drill and a rotary hammer.

* * * * *